United States Patent [19]

Hermann

[11] 4,216,243

[45] Aug. 5, 1980

[54] YOGURT BEVERAGE AND METHOD FOR MANUFACTURE THEREOF

[75] Inventor: Lawrence F. Hermann, Buffalo Grove, Ill.

[73] Assignee: Kraft, Inc., Glenview, Ill.

[21] Appl. No.: 950,788

[22] Filed: Oct. 12, 1978

[51] Int. Cl.$^2$ .............................................. A23C 9/12
[52] U.S. Cl. .................................... 426/583; 426/590; 426/654
[58] Field of Search ............... 426/583, 590, 654, 573, 426/575

[56] References Cited

U.S. PATENT DOCUMENTS

| | | | |
|---|---|---|---|
| 1,710,133 | 4/1929 | Winkler | 426/583 |
| 3,022,176 | 2/1962 | Lawrence | 426/583 |
| 3,118,769 | 1/1964 | Pletcher | 426/583 |
| 3,432,306 | 3/1969 | Edwards | 426/583 |
| 3,625,702 | 12/1971 | Exler | 426/583 |
| 3,726,690 | 4/1973 | Schuppner | 426/583 |
| 3,800,052 | 3/1974 | Inagami et al. | 426/583 |

*Primary Examiner*—Jeanette M. Hunter
*Attorney, Agent, or Firm*—Fitch, Even & Tabin

[57] ABSTRACT

A sweetened fluid yogurt beverage having a relatively low acidity which will remain stable during storage without separation is provided. A base mix of non-fat milk solids, fat and sugar is provided. The base mix is inoculated with a yogurt culture and is permitted to ferment to provide a sweetened yogurt beverage having from about 0.75% to about 1.25% titratable acidity. The coagulum is broken by agitating the coagulum to provide a fluid yogurt. A stabilizing composition containing xanthan gum and guar gum is added to the fluid yogurt. The stabilized fluid yogurt is then pasteurized to stop any further bacterial fermentation. The fermented fluid yogurt is then homogenized and packaged.

13 Claims, No Drawings

YOGURT BEVERAGE AND METHOD FOR MANUFACTURE THEREOF

The present invention generally relates to the manufacture of liquid yogurt which is consumed as a beverage. More particularly, the present invention is directed to a method for the preparation of flavored, sweetened yogurt in liquid form which is resistant to curd/whey separation during storage.

Yogurt is a cultured milk product prepared by the use of bacteria. Usually, *L. bulgaricus,* a lactic acid forming rod-shaped bacterium is grown in combination with *S. thermophilus,* a coccus-shaped bacterium able to grow and produce lactic acid at the higher temperatures associated with yogurt manufacture, typically from about 110° F. to about 120° F. A milk culture of these organisms is used to inoculate the milk to be made into yogurt.

Yogurt is generally manufactured in accordance with the following procedure: The mild to be used is pasteurized and cooled from the pasteurization temperature to an incubation temperature of 110°–120° F. A milk culture of the organism to be used to inoculate the milk is added to the milk. The inoculated mix is fermented until the desired acidity is attained which usually occurs in three to five hours. It is usually desirable to establish an acidity of at least 1.0 percent and preferably in the range of from about 1.1 to 1.5 percent titratable acidity. This level of acidity is well past the isoelectric point for the milk protein. Coagulation occurs during the incubation period and if the incubation is permitted to take place quiescently, a gel-like body is obtained. Such gel-like body is considered desirable in accordance with current commercial practice. It is known, however, to break the gel-like body by agitation and to provide a yogurt product with a beverage consistency. This was the usual practice in Eastern European countries and yogurt is generally regarded as a beverage in such countries. The broken yogurt having a beverage consistency, however, is unstable and if permitted to stand for any considerable storage period it tends to separate into curd and whey. Homogenization, after incubation, has been used to increase stability of fluid yogurt; but, homogenization has not wholly solved the problem of instability of the fluid yogurt and there remains a tendency for the fluid yogurt to separate. It is this tendency of the yogurt to separate that has resulted in the present commercial practice of marketing yogurt as a spoonable product and little yogurt is marketed presently as a liquid beverage.

The tendency of the broken fluid yogurt to separate is enhanced if the acidity developed is less than the customary range of at least about 1.0 percent titratable acidity. The tendency to separate is also enhanced when a natural sweetener is present in the yogurt composition. It would be desirable, however, to provide a stable fluid yogurt which is flavored, sweetened and which has a low level of acidity compared to conventional yogurt.

Accordingly, it is a principal object of the present invention to provide a stable, fluid yogurt product.

It is another object of the present invention to provide a method for the manufacture of a fluid yogurt which provides a fluid yogurt which can be stored for lengthy periods without separating into curd and whey.

It is a further object of the present invention to provide a fluid yogurt and a method for manufacturing such fluid yogurt from a sweetened milk base.

It is a still further object of the present invention to provide a fluid yogurt product of low acidity which is stable and which does not separate into curd and whey during lengthy periods of storage.

These and other objects of the present invention will become more apparent with the following detailed description and the accompanying claims.

The present invention provides a sweetened, fluid yogurt beverage having a relatively low acidity of from between about 0.75 and about 1.25 percent titratable acidity which will remain stable during storage without separation. To provide the stable, sweetened fluid yogurt beverage, the present invention provides a novel stabilizer composition which is used to provide the desired product. The stabilizer composition is a combination of xanthan gum and guar gum. The xanthan gum is present in the composition at a level of from about 60 to about 75 percent by weight of the stabilizing composition and the guar gum is present at a level of from about 25 to about 40 percent by weight of the composition.

The process of the present invention for making a sweetened, fluid yogurt beverage having a relatively low acidity comprises the following steps. A base mix of non-fat milk solids, fat and sugar is provided. The base mix is then inoculated with a yogurt culture. The inoculated base mix is permitted to ferment to provide a coagulum from about 0.75 to about 1.25 percent titratable acidity. The coagulum is then broken by agitating the coagulum to provide a fluid yogurt. A stabilizing composition, as described above, is then added to the fluid yogurt at a level of from about 0.15 to about 0.40 percent by weight based on the final weight of the fluid yogurt. The fluid yogurt, containing the stabilizing composition, is then pasteurized to stop any further bacterial fermentation. The pasteurized fluid yogurt is then homogenized and packaged. Prior to packaging, any desirable flavor can be added to the fluid yogurt beverage.

Now considering the components and steps of the process of the present invention in more detail. The finished fluid yogurt product preferably has a fat level of from about 0.5 to about 4 percent by weight. The fat may be provided from any suitable edible animal or vegetable fats, such as milk fat, coconut oil, corn oil, soybean oil, cottonseed oil, etc. The fat preferably has an I.V. of at least about 70 and most preferably has an I.V. in the range of from about 70 to about 110. Non-fat milk solids are present in the base mix at a level of from about 8 to about 13 percent by weight. The non-fat milk solids are preferably provided from whole milk, skim milk, or from spray dried skim milk or skim milk dried by other drying methods. The sugar is present in the base mix at a level of from about 4 to about 14 percent by weight. Any natural sugar, such as sucrose, glucose or lactose can be used in the base mix. The base mix is prepared by simply blending the components of the base mix together in any suitable equipment.

The base mix preferably utilizes whole milk as the principal fat source and the principal source for non-fat milk solids. The base mix preferably contains from about 86 to about 92 percent by weight of whole milk. Whole milk will usually have from about 3.3 to about 3.8 percent butterfat and from about 8.5 to about 10 percent non-fat milk solids. The whole milk can be used as the sole fat source and sole source of non-fat milk solids. Additional non-fat milk solids can be added or a portion or all of the fat source can be a non-dairy fat, such as coconut oil used in combination with skim milk and/or non-fat dry milk solids.

The base mix is then pasteurized under suitable heat conditions to provide a desirable substitute for the yogurt cultures, such as by heating the base mix to a temperature of from about 180° F. to about 190° F. for a hold time of from about 15 to about 45 minutes. After pasteurization, the base mix is cooled to 150° F. and is then homogenized, preferably in a single stage homogenizer at a pressure of from about 1500 to about 2500 psig.

The base mix is then cooled to a suitable temperature for fermenting yogurt cultures. A preferred temperature range is from about 98° F. to about 120° F., most preferably from about 110° F. to about 120° F. The base mix is then inoculated with a suitable yogurt culture. The preferred yogurt culture is a 50/50 mixture by weight of *L. bulgaricus* and *S. thermophilus*. The yogurt cultures are usually obtained as a lyophilized powder or frozen liquid and are pre-activated prior to adding the yogurt cultures to the base mix. Pre-activation is performed by adding the lyophilized powder or frozen liquid to a suitable growth medium such as whole milk or skim milk and permitting the yogurt cultures to attain a viable, rapidly growing condition.

The inoculated base mix is then fermented for a period sufficient to establish a titratable acidity of from about 0.75 to about 1.25 percent, preferably from about 0.80 to about 0.95 percent, equivalent lactic acid. This titratable acidity is usually reached in a period of from about 2 to about 3 hours at the preferred temperature but can take up to about 12 hours at the lowest fermentation temperature of about 98° F.

After the fermentation has been completed to provide a cultured yogurt product, the yogurt is agitated to break any coagulum which forms during fermentation and provide a fluid product. The stabilizing composition is preferably added during the agitation under high shear conditions to disperse the stabilizing composition in the yogurt product. A portion of the sugar may also be added at this time. The stabilized yogurt product is then subjected to high temperature short time heat conditions of from about 180° F. to about 195° F. for 15 to 45 seconds to stop any further bacterial fermentation. The fluid yogurt product is then homogenized at a pressure of from about 500 to about 2500 psig. The fluid yogurt product is then ready for packaging.

It should be noted that the acid level in the yogurt beverage of the present invention is less than the acid level usually associated with a yogurt product having a gel-like body. This means that the acidity is closer to the isoelectric point for the casein of the milk and the susceptibility to forming a gel-like body for the yogurt product of the present invention is greater than for conventional yogurt having a higher level of acidity which is further removed from the isoelectric point. It is therefore apparent that the principal feature of the present invention is the discovery that a liquid yogurt beverage having low acidity and which is sweetened can be prepared which is stable against separation by using the synergistic effects of the stabilizer composition of the present invention comprising xanthan gun and guar gum.

The following examples further illustrate various features of the invention but are intended to in no way limit the scope of the invention which is defined in the appended claims.

EXAMPLE I

One thousand pounds of a strawberry-flavored yogurt beverage was prepared in accordance with the invention. A drink base was first prepared having the following ingredients at the indicated levels.

| DRINK BASE | |
|---|---|
| Ingredient | Percent by Weight |
| Whole raw milk (3.6% butterfat) | 92.5 |
| Non-fat dry milk | 2.5 |
| Sugar (sucrose) | 5.0 |

The drink base was heated at 185° F. for fifteen minutes to pasteurize the drink base. The drink base was then cooled to 150° F., homgenized, single stage, at 2500 psig and cooled to 110° F. prior to addition of a starter culture. The drink base was inoculated with a preactivated starter culture of *L. bulgaricus* and *L. thermophilus*. The preactivated starter was added to the drink base at a level of 4 percent by weight. The drink base was permitted to ferment for 2.5 hours until the titratable acidity was in the range of 0.85-0.90% to provide cultured yogurt. At this level of acidity, a coagulum had formed.

A stabilized yogurt beverage was then prepared containing the following ingredients at the indicated level.

| STABILIZED YOGURT BEVERAGE | |
|---|---|
| Ingredient | Percent by Weight |
| Cultured yogurt | 95.3 |
| Stabilizer composition (xanthan gum-guar gum at a rtio of 2:1 by weight) | .22 |
| Disodium phosphate | .25 |
| Potassium sorbate | .05 |
| Granulated sucrose | 4.2 |

The stabilized yogurt beverage was prepared by breaking the cultured yogurt coagulum by agitation and thereafter adding a blend of the dry ingredients to a portion of the cultured yogurt by means of a powder funnel. The portion containing the blend of dry ingredients was then added back to the remaining portion of cultured yogurt. The mixture was then pasteurized at a temperature of 190° F. for 27 seconds, was cooled to a temperature of 150° F. and was homogenized at a pressure of 700 psig single stage. The stabilized yogurt drink base was then cooled to 45° F. and a strawberry flavor was added thereto. The flavored yogurt beverage was then packaged into eight-ounce containers and was stored under refrigeration conditions at a temperature of 40° F. for a period of several weeks. After four week's storage, the stabilized yogurt beverage was still fluid and had not separated. The product was considered to have an acceptable tart yogurt flavor by a flavor panel.

EXAMPLE II

The method of Example I was used to prepare a low fat liquid yogurt product containing 0.95 percent by weight fat. A drink base was first prepared having the following ingredients at the indicated level.

| DRINK BASE | |
|---|---|
| Ingredient | Percent by Weight |
| Skim milk | 87.2 |
| Cream (36% milk fat) | 2.9 |
| Non-fat dry milk | 2.4 |
| Liquid sugar (70% sugar solids) | 7.5 |

After four weeks of storage the low fat liquid yogurt product prepared in accordance with the above, was still fluid and had not separated. The product was considered to have an acceptable tart yogurt flavor by a flavor panel.

What is claimed is:

1. A process for manufacture of a fluid yogurt composition comprising providing an aqueous base mix of non-fat milk solids, fat and sugar, pasteurizing and homogenizing said base mix, innoculating said base mix with a yogurt culture, fermenting said base mix to provide a coagulum, breaking said coagulum by agitating said coagulum to provide a fluid yogurt, adding to the fluid yogurt a stabilizing composition in an amount of from about 0.15 percent to about 0.40 percent by weight of said fluid yogurt, said stabilizing composition comprising xanthan gum and guar gum and pasteurizing and homogenizing said stabilized fluid yogurt to stop any further fermentation and to provide a fluid yogurt composition having an extended shelf life with a lessened tendency to separate.

2. A process in accordance with claim 1 wherein said base mix is pasteurized and homogenized prior to being inoculated with said yogurt culture.

3. A process in accordance with claim 1 wherein said fat is provided by whole milk, said whole milk being present in said base mix at a level of from about 86 to about 92% by weight.

4. A process in accordance with claim 1 wherein said non-fat milk solids are present in said base mix at a level of from about 4 to about 14% by weight.

5. A process in accordance with claim 1 wherein said fat is present in said fluid yogurt beverage at a level of from about 0.5 to about 4% by weight.

6. A process in accordance with claim 1 wherein said xanthan gum is present in said stabilizing composition at a level of from about 60 to about 75% by weight and said guar gum is present at a level of from about 25 to about 40% by weight.

7. A stabilized fluid yogurt composition comprising non-fat milk solids, water, fat, sugar and a stabilizing composition comprising from about 60 to about 75% by weight of xanthan gum based on the total weight of the stabilizing composition and from about 25 to 40 percent by weight of guar gum, based on the total weight of the stabilizing composition, said stabilizing composition comprising from about 0.15 percent to about 0.40 percent by weight of said yogurt composition.

8. A stabilized fluid yogurt composition in accordance with claim 7 wherein said fat is provided by whole milk fat.

9. A stabilized fluid yogurt composition in accordance with claim 7 wherein said non-fat milk solids are present at a level of from about 4 to about 14% by weight.

10. A stabilized fluid yogurt composition in accordance with claim 7 wherein said fat is present in said fluid yogurt beverage at a level of from about 0.5 to about 4% by weight.

11. A stabilized fluid yogurt composition in accordance with claim 7 wherein said xanthan gum is present in said stabilizer composition at a level of from about 60 to about 75% by weight and said guar gum is present at a level of from about 25 to about 40% by weight.

12. A process according to claim 1 where said coagulum has an acidity of between about 0.75 and about 1.25 percent.

13. A stabilized fluid yogurt composition according to claim 7 wherein said yogurt composition has an acidity of between about 0.75 and about 1.25 percent.

* * * * *